Dec. 27, 1955    R. A. FISCH    2,728,104
CURVED EXTRUSION PROCESS AND APPARATUS
Filed March 7, 1952
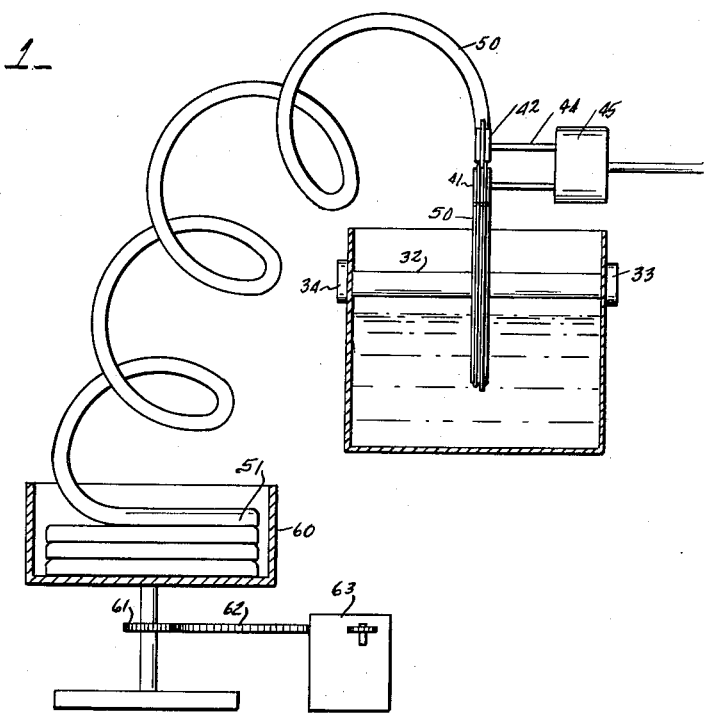
FIG. 1
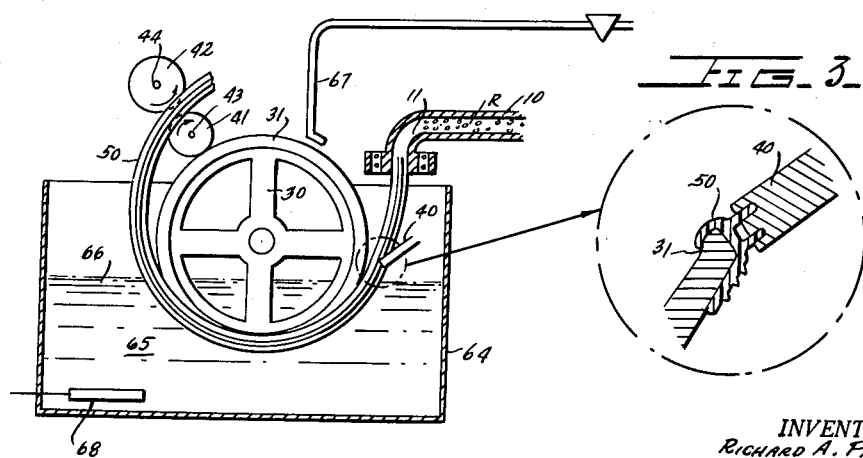
FIG. 2
FIG. 3
INVENTOR.
RICHARD A. FISCH
BY
Greene, Pueler & Dunn
ATTORNEYS

United States Patent Office 2,728,104
Patented Dec. 27, 1955

2,728,104

CURVED EXTRUSION PROCESS AND APPARATUS

Richard A. Fisch, Kew Gardens, N. Y.

Application March 7, 1952, Serial No. 275,391

4 Claims. (Cl. 18—12)

This invention relates to an improved process for producing curved extrusion products having one or more channels.

This application is a continuation-in-part of application No. 82,052, filed March 18, 1949, now Patent 2,601,629, issued June 24, 1952. In that application an apparatus and process for producing curved extrusion products which have one or more longitudinal channels is disclosed wherein a thermoplastic material is extruded laterally through a forming die and then immediately supported and bent to shape by a rotating member in the form of a helix and having a peripheral portion adapted to fit into a channel on the extrusion product. The individual coils of the rotating supporting member are circular, elliptical or polygonal, i. e., they have the size and configuration desired in the finished extrusion product. When a helix has all its coils filled with the plastic extrusion product it is replaced by another, etc., so that the process is primarily a discontinuous one. Among the objects of this invention is to provide an improved reshaping apparatus and process whereby the extrusion and curving of the thermoplastic material to produce curved channel members may be made substantially continuous.

Many extrusion products can be heated and reshaped after extrusion but in the case of channel members any attempt at reshaping after the product sets causes strains to be set up in the weakest part of the product (the channel walls) and also causes buckling and distortion of the channel walls.

Curved extrusion products having channels may be made by processes employing a die with a curved orifice therein but these dies are difficult to make, expensive and the curvature obtainable is fixed by the curvature of the die wall.

Among other objects of the invention is to provide an improved process and apparatus for quickly and continuously forming curved products with internal channels by means of ordinary types of extrusion dies having channel forming orifices.

These objects and others ancillary thereto are obtained by extruding the thermoplastic material downwardly, through a die having the desired form of channel forming orifice, rotating a supporting member having a flange adapted to fit snugly into a channel of the extruded product, quenching the extruded product along the path followed by the periphery of the supporting member and withdrawing the curved and quenched product from the supporting member before the former has completed more than ¾ of a revolution thereon.

Preferably the extrusion die is heated so that the extruded product is still in a plastic condition as it leaves the nozzle. By extruding downwardly there is less tendency for the soft flanges of the channels to become distorted by gravitational forces.

Because the plastic material is at a temperature close to or above the boiling point of water all traces of water or other quenching liquid on the supporting flange must be removed for otherwise the vaporization of the liquid between the supporting flange and the plastic material will distort the product or force it off of the said supporting wheel.

Any desired cooling liquid or fluid may be employed for quenching the plastic. Water is the most available liquid and works very satisfactorily. Jets of cooling gas could also be employed.

The process is applicable to the manufacture of channel members from any desired thermoplastic materials. Many examples of such thermoplastic materials may be given but the most common are (1) the cellulose esters and ethers such as cellulose acetate, cellulose acetate butyrate, cellulose acetate propionate, ethyl cellulose, (2) the polyvinyl compounds such as polyvinyl acetate, polyvinyl chloride, polyvinyl alcohol, polystyrene, (3) natural and synthetic rubbers and elastomers, (4) polyethylene, etc.

The foregoing and other objects of the invention will be best understood from the following description of exemplifications of the same when read in connection with the accompanying drawings in which:

Fig. 1 is an end view of the supporting roll and take-off means.

Fig. 2 is a side view of the apparatus.

Fig. 3 is an enlarged detail view of the circled portion of Fig. 2.

The thermoplastic material R is forced through the extrusion device 10 having a curved channel which ends in an extrusion die 20 with an orifice 21 which extends downwardly. The extrusion die 20 is attached to the channel 11 of the extrusion machine in any desired way. The pressure means for forcing the thermoplastic material through the nozzle is not shown but may comprise any known type of pressure means such as a plunger, an extrusion screw, etc. The die is surrounded by a heating jacket having openings 25 for the circulation of heating fluid therethrough.

The plastic material is extruded so that the portions which are to form the interior channel face towards the peripheral supporting flange 31 of rotating wheel 30. The channel in the extruded product is forced to straddle the supporting flange 31 by a stationary jig 40 which is shaped to complement the exterior shape of the extruded product. Although the jig 40 is shown as stationary it is obvious that a rotating wheel could be substituted therefor.

The wheel or supporting member 30 is not positively rotated, it is mounted on axle 32 which is freely mounted in bearing 33, 34 so that the roller 30 is rotated only by the pull of the two rollers 41, 42 on the extruded product 50. Since the supporting and configuration-shaping roller 30 is not positively rotated it may have any desired outside configuration i. e., it may be elliptical or regularly or irregularly polygonal in configuration because no matter how it is shaped it will not exert any pull or distorting force on the extruded product. The pair of rollers 41, 42 have peripheral contours which fit into one or more grooves of the extruded product to securely grip and take the curved product off of the roller 30. As shown in Fig. 1 the extruded product retains the configuration imparted to it by the roller 30 and can be collected in the container 60 which is rotated by gears 61, 62 and drive 63 to cause the product to be deposited in the form of a continuous helix 51. Rollers 41 and 42 may both be positively rotated through shafts 43 and 44 and gear box 45. To retain the curvature the roller 42 must rotate at a slightly greater peripheral speed than roller 41. In the device shown rollers 41 and 42 are rotated at the same angular speed but roller 42 is made slightly larger than roller 41 to provide for the greater speed of the outside surface with respect to the inside surface of the curved product 50.

The tank 64 contains the cooling fluid 65. The level 66 of the cooling liquid 65 (where liquid is employed as the fluid) must be below the point where the extruded product is forced onto the flange 31 of roller 30 so that no liquid gets in between the flange 31 and the hot extruded product. Also since some liquid will drip back onto the flange 31 after product 50 leaves roller 30 it is necessary to remove this liquid. In Fig. 2 this is done by the jet 67 which removes liquid from the surface. Dry air may be employed in the drying jet 67.

In order to obtain a uniform quenching it is desirable to maintain the temperature of the quenching liquid 65 uniform and the thermostat heater 68 is provided for this purpose.

As an example of the actual operation of the process, a polyethylene composition is extruded through nozzle 20. The polyethylene leaves the nozzle at a temperature of between 250 and 300° F. The water in the bath is maintained at a temperature of 110° F. and the curved product is drawn off by rollers 41, 42 at the speed of extrusion which is approximately 35 feet per minute.

Thus the invention provides a process and apparatus for continuously curving extrusion products of unusual cross sectional design while supporting the products and simultaneously preventing any distortion of the cross sectional shape and any undesired distortion of the linear shape of the extruded product. The apparatus is simple to construct and easy to operate and it can be quickly adjusted to the formation of an extrusion product having a different cross sectional shape or a different linear configuration.

I claim:

1. A process of producing curved channel members comprising the steps of extruding a straight channel member from an extrusion die, continuously inserting a rotatable continuous curving member into the channel as the extruded member comes from the die, cooling the extruded member until it is set while it is rotated and curved by said continuous member and removing the set channel member laterally from the rotatable curving member before said channel member has traveled through an angular distance of 270° while maintaining the curvature given said channel member by said curving member whereby to form a channel member in the linear form of a helix.

2. A process of producing curved channel members comprising the steps of extruding a straight channel member downwardly from an extrusion die, continuously inserting a rotatable continuous curving member into the channel as the extruded member comes from the die, cooling the extruded member until it is set by dipping the curving member with the channel member thereon into a quenching liquid, removing the set channel member laterally from the rotatable curving member before said channel member has traveled through an angular distance of 270° while maintaining the curvature given said channel member by said curving member whereby to form a channel member in the linear form of a helix, and maintaining said curving member free of said quenching liquid as the former first comes into contact with the uncurved, freshly extruded portion of said channel member.

3. An apparatus for the production of curved channel members, comprising an extruding machine having an extrusion die with an orifice containing at least one channel therein, a freely rotatable, configuration-forming means having a curved periphery and comprising a peripheral flange adapted to fit within a channel on the extruded product, said configuration-forming means being located adjacent to but spaced from the die orifice, means to draw the extruded product away from said rotatable configuration-forming means at the rate the said product is extruded and before the latter travels through an angular distance of 270° with respect to the axis of rotation of the rotatable configuration-forming means, and means for applying a quenching fluid to the extruded product after it has been fitted on said flange of the configuration-forming means to set the said product in the curved shape of the said configuration-forming means.

4. An apparatus for the production of curved channel members, comprising an extruding machine having an extrusion die with an orifice containing at least one channel therein, with the opening thereof facing downwardly, a freely rotatable, configuration-forming means having a curved periphery and comprising a peripheral flange adapted to fit within a channel on the extruded product, said configuration-forming means being located adjacent to but spaced from the die orifice, means to draw the extruded product away from said rotatable configuration-forming means at the rate the said product is extruded and before the latter travels through an angular distance of 270° with respect to the axis of rotation of the rotatable configuration-forming means, a bath adapted to contain a quenching liquid surrounding the lower portion of said configuration-forming means, and means adjacent the upper portion of said configuration-forming means to continuously remove quenching liquid from the surface of the peripheral flange thereof.

References Cited in the file of this patent

UNITED STATES PATENTS

| | | |
|---|---|---|
| 237,628 | Stuart | Feb. 8, 1881 |
| 1,159,895 | Canda | Nov. 9, 1915 |
| 1,584,283 | Fraser | May 11, 1926 |
| 1,740,029 | Moomy | Dec. 17, 1929 |
| 2,167,971 | Cadden | Aug. 1, 1939 |
| 2,246,236 | Becker | June 17, 1941 |
| 2,294,555 | Hendrie | Sept. 1, 1942 |
| 2,315,477 | Parkhurst | Mar. 30, 1943 |
| 2,582,340 | Layte | Jan. 15, 1952 |